United States Patent
Zhang et al.

(10) Patent No.: US 10,935,508 B2
(45) Date of Patent: Mar. 2, 2021

(54) LIQUID DETECTION DEVICE AND LIQUID DETECTION SYSTEM FOR ABNORMAL LIQUID ON A SURFACE

(71) Applicant: XIAMEN ECO LIGHTING CO. LTD., Xiamen (CN)

(72) Inventors: Youhe Zhang, Xiamen (CN); Guanwei Li, Xiamen (CN); Guoming Yan, Taipei (TW)

(73) Assignee: XIAMEN ECO LIGHTING CO. LTD., Xiamen (CN)

( * ) Notice: Subject to any disclaimer, the term of this patent is extended or adjusted under 35 U.S.C. 154(b) by 246 days.

(21) Appl. No.: 15/912,577

(22) Filed: Mar. 6, 2018

(65) Prior Publication Data

US 2019/0064092 A1 Feb. 28, 2019

Related U.S. Application Data (60) Provisional application No. 62/550,898, filed on Aug. 28, 2017.

(51) Int. Cl.
| | | |
|---|---|---|
| *G01N 27/02* | (2006.01) | |
| *H05F 3/00* | (2006.01) | |
| *G01M 3/16* | (2006.01) | |

(52) U.S. Cl.
CPC ............ *G01N 27/02* (2013.01); *G01M 3/16* (2013.01); *H05F 3/00* (2013.01); *G01N 2223/647* (2013.01)

(58) Field of Classification Search
CPC ............ G01N 2223/647; G01N 27/02; G01N 27/023; G01N 27/07; G01N 27/226; G01N 27/605; G01N 27/60; G01N 27/61; G01N 27/225; G01N 27/227; G01N 27/025; G01N 27/026; G01N 27/27; G01M 3/40; G01M 3/045
USPC .............................. 73/304 C, 335.04, 335.05
See application file for complete search history.

(56) References Cited

U.S. PATENT DOCUMENTS

| | | | | |
|---|---|---|---|---|
| 3,069,671 A | * | 12/1962 | Taylor ..................... | F24H 9/165 340/616 |
| 4,603,581 A | * | 8/1986 | Yamanoue ............ | G01F 23/268 340/620 |
| 4,734,684 A | * | 3/1988 | Limburg .................. | G01B 7/14 340/540 |
| 4,862,315 A | * | 8/1989 | Cubbison, Jr. ............ | H05F 3/06 361/212 |

(Continued)

*Primary Examiner* — Tran M. Tran
(74) *Attorney, Agent, or Firm* — Chun-Ming Shih; Lanway IPR Services (57) ABSTRACT

A liquid detection device and a liquid detection system are provided for detecting whether there is abnormal liquid on the surface to be detected. The liquid detection system can be used in specific working areas. A first electrode and a second electrode are used. The first electrode and the second electrode are mounted on the housing. A measuring circuit is installed inside the housing. The measuring circuit measures the impedance value between the first electrode and the second electrode, to distinguish whether there is abnormal liquid or not. The liquid detection system includes a plurality of liquid detection devices and a controller. The controller is responsible for collecting the measurement results of the plurality of liquid detection devices and performing corresponding operations.

10 Claims, 9 Drawing Sheets

(56) References Cited

U.S. PATENT DOCUMENTS

| | | | | |
|---|---|---|---|---|
| 5,047,892 A * | 9/1991 | Sakata | H01T 23/00 | 361/231 |
| 5,546,009 A * | 8/1996 | Raphael | G01F 23/242 | 324/556 |
| 5,638,249 A * | 6/1997 | Rubino | G09F 7/12 | 361/225 |
| 5,761,022 A * | 6/1998 | Rankilor | H05F 3/00 | 361/214 |
| 5,777,206 A * | 7/1998 | Zuchner | G01N 27/223 | 324/674 |
| 6,073,488 A * | 6/2000 | Byatt | G01B 7/085 | 73/304 C |
| 6,150,945 A * | 11/2000 | Wilson | G01R 29/12 | 340/661 |
| 6,175,310 B1 * | 1/2001 | Gott | G01M 3/165 | 340/604 |
| 6,225,809 B1 * | 5/2001 | Watano | G01N 27/60 | 324/464 |
| 6,318,172 B1 * | 11/2001 | Byatt | G01F 23/265 | 73/304 C |
| 6,737,329 B2 * | 5/2004 | Lepert | G06K 9/00053 | 382/124 |
| 6,873,516 B1 * | 3/2005 | Epstein | H05F 3/02 | 361/212 |
| 6,938,476 B2 * | 9/2005 | Chesk | G01F 23/24 | 340/620 |
| 7,032,434 B2 * | 4/2006 | Lee | A47L 15/421 | 73/40 |
| 7,054,129 B2 * | 5/2006 | Aida | H05F 3/04 | 361/220 |
| 7,324,322 B2 * | 1/2008 | Fujita | H05F 3/04 | 361/212 |
| 7,554,095 B2 * | 6/2009 | Fuse | B82Y 10/00 | 250/396 R |
| 7,561,403 B2 * | 7/2009 | Onezawa | H01T 23/00 | 361/231 |
| 8,176,773 B2 * | 5/2012 | Yamakawa | G01N 29/036 | 73/61.49 |
| 8,373,232 B2 * | 2/2013 | Solo De Zaldivar | G01R 29/24 | 257/356 |
| 8,482,288 B2 * | 7/2013 | Yokoi | F02D 41/1466 | 123/479 |
| 8,789,414 B2 * | 7/2014 | Park | G01F 23/268 | 73/149 |
| 9,097,639 B2 * | 8/2015 | Potyrailo | H04Q 9/00 | |
| 9,261,474 B2 * | 2/2016 | Potyrailo | G01N 27/026 | |
| 9,383,289 B1 * | 7/2016 | Meyer | G08B 25/14 | |
| 9,645,117 B2 * | 5/2017 | Tanabe | G01N 11/16 | |
| 9,645,145 B2 * | 5/2017 | Tsukamoto | G01N 27/403 | |
| 9,927,389 B2 * | 3/2018 | Rowhani | G01N 27/307 | |
| 9,939,346 B2 * | 4/2018 | Jerez | G01M 3/2815 | |
| 10,154,819 B2 * | 12/2018 | Emery | G01R 27/14 | |
| 10,348,085 B2 * | 7/2019 | Ikeda | H01L 27/0262 | |
| 10,451,467 B2 * | 10/2019 | Otagaki | G01F 23/268 | |
| 2008/0192403 A1 * | 8/2008 | Chen | H05F 3/04 | 361/220 |
| 2009/0126465 A1 * | 5/2009 | Kedjierski | G01M 3/186 | 73/40.5 R |
| 2010/0294021 A1 * | 11/2010 | Makino | G01N 25/18 | 73/25.03 |
| 2010/0321027 A1 * | 12/2010 | Khater | B81C 99/003 | 324/452 |
| 2011/0259079 A1 * | 10/2011 | Maeda | G01N 15/0656 | 73/23.33 |
| 2012/0253691 A1 * | 10/2012 | Graf | G01N 27/223 | 702/24 |
| 2013/0233707 A1 * | 9/2013 | Kato | G01N 27/27 | 204/406 |
| 2016/0103086 A1 * | 4/2016 | Kato | G01N 17/02 | 324/438 |
| 2016/0155948 A1 * | 6/2016 | Murase | H01L 51/0036 | 422/69 |
| 2017/0026760 A1 * | 1/2017 | Albers | H04R 23/00 | |
| 2018/0003663 A1 * | 1/2018 | Kameshiro | G01N 27/226 | |
| 2018/0143613 A1 * | 5/2018 | Tahan | F17D 5/06 | |
| 2018/0180310 A1 * | 6/2018 | Abel | F24F 11/0008 | |
| 2018/0275009 A1 * | 9/2018 | Murakami | G01M 3/40 | |
| 2019/0041349 A1 * | 2/2019 | Suy | G01N 27/226 | |
| 2020/0033217 A1 * | 1/2020 | Miclaus | G01N 33/0009 | |
| 2020/0177108 A1 * | 6/2020 | Ozawa | H01L 21/6833 | |

* cited by examiner

LIQUID DETECTION DEVICE AND LIQUID DETECTION SYSTEM FOR ABNORMAL LIQUID ON A SURFACE

FIELD OF INVENTION

The present invention relates to a liquid detection device and a liquid detection system, and more particularly, to a liquid detection device and a liquid detection system capable of increasing the accuracy.

BACKGROUND

Currently, the leak sensor probe on the market, due to small size and light weight, it can't cling to the ground under normal circumstances. If a water leakage occurs, it often can't be detected in the first time. In addition, the electrodes in the leak sensor probe only conducted by wire. If the coating material of the tail wire is aged, the two electrodes contact and cause a short circuit and raise a water leakage alarm. The water leakage alarm will also be raised when the user treads the probe with barefoot or wet soles. The high probability of false triggering and the low actual reaction sensitivity of the existing products bother the users.

SUMMARY OF THE INVENTION

Therefore, the present invention provides a liquid detection device that solves the problem of false alarms, increases the reliability of the detection device, improves the problem that it can't cling to the ground in the prior art, overcomes and distinguishes the fog or water droplets caused by over-humid weather in various countries. In addition, in order to reduce false alarms caused by over-drying and static electricity, the present invention utilizes the periodic elimination of static electricity to protect the circuit and achieve the best effect of detecting the impedance. Meanwhile, the invention also can distinguish the short circuit caused by the aging of the electric wire or water leakage, significantly reduce the false alarm situation.

The first embodiment of the present invention provides a liquid detection device for detecting whether there is abnormal liquid on the surface to be detected. The abnormal liquid according to different occasions have a variety of definitions, including chemical solutions, acidic solutions, alkaline solutions, oil and water. Abnormal liquid accumulation may affect the normal operation of equipment, result in production line failure, and cause damage to buildings. Moreover, abnormal liquid accumulation even cause work safety accidents. Liquid detection devices are widely used in sewerage system and water supply system of buildings and congregate housing. Liquid detection devices are also applied to agricultural water supply systems, water purification stations, sewage treatment plants and general factories.

The liquid detection device corresponding to the present invention is easy to install and maintain. The liquid detection device has the characteristics of fast response, along life, and not easily to be damaged.

The liquid detection device according to the present invention includes a housing, a first electrode, a second electrode and a measuring circuit. The first electrode is mounted on the surface of the housing. A distance between the first electrode and the surface to be detected is set as the first distance. The second electrode is also mounted on the surface of the housing. A distance between the second electrode and the surface to be detected is set as the second distance. The first distance and the second distance are different.

The measuring circuit is installed inside the housing. The measuring circuit connects the first electrode and the second electrode. When abnormal liquid appeared on the surface to be detected, a current loop is generated between the first electrode and the second electrode, and then the measuring circuit measures impedance value of the current loop between the first electrode and the second electrode, to distinguish whether there is abnormal liquid on the surface to be detected or not.

The liquid detection device may further include a support structure. The support structure is mounted on the surface of the housing. The liquid detection device contacts with the surface to be detected through the support structure to become a stable support point, such that the first distance between the first electrode and the surface to be detected and the second distance between the second electrode and the surface to be detected can be maintained.

The first distance and the second distance between the liquid detection device and the surface to be detected are different. Through the difference in distance, when the surface to be detected is just beginning to have abnormal liquid, the first electrode and the second electrode are not yet turned on. After a period of time, when sufficient abnormal liquid accumulated on the surface to be detected, to meet the second electrode, conduction is generated between the first electrode and the second electrode. The detection accuracy of the measuring circuit can be adjusted by such a design, so that the liquid detection device can adjust the sensitivity according to the environmental and then reduce the probability of signal misjudgment.

The liquid detection device may further include a static electricity elimination circuit. The static electricity elimination circuit eliminates static electricity existed in the liquid detection device according to predetermined setting. The so-called static electricity, are stationary charges or the non-flowing charges (the flowing charges form current). Static electricity generated when charges accumulated on or over an object. Charge transfer occurs when an object with static electricity contacts a zero-potential object (grounded object), or contacts an object with a potential difference from it. In daily life, any two objects of different materials contact with each other and then separate, static electricity will be generated. The objects mentioned here can be solid, liquid or even gas, which can be electrostatically charged by contact and separation. As the gas is also composed of molecules, atoms, when the air flows, molecules, atoms also can be electrostatically charged by "contact and separation". In other words, static electricity can be generated at anytime and anywhere in our life. Static electricity accumulated on the electrode surface of the liquid detection device, which will make the electrode surface easy to absorb dust and oil, affecting the detection accuracy. It may also explode due to the electrostatic spark igniting the flammable objects nearby.

In the liquid detection device with the static electricity elimination circuit, the static electricity elimination circuit can detect and record the static electricity quantity of the environment, and allow the measuring circuit to refer to the static electricity quantity of the environment. When the current loop generated between the first electrode and the second electrode, which is caused by the static electricity accumulated on the electrode surface, the measurement circuit will not issue the corresponding control information. It can effectively avoid misjudgment by this method. In addition to eliminate the static electricity existed in the liquid detection device according to a preset value and detecting and recording the static electricity quantity of the environment, the static electricity elimination circuit may be timed by the central processing unit to periodically eliminate the static electricity. In addition to calculating the time through the central processing unit, various circuits can be used to achieve the same function.

In an embodiment of the present invention, the housing of the liquid detection device is oblate, and the first electrode and the second electrode are semicircular. In addition, there is a distance between the first electrode and the second electrode. For example, the distance may be 2.5 mm or more, to reduce the probability of short circuit. In this embodiment, the liquid detection device may further include a fixing auxiliary element, such as a magnet, a clip, a sticker, a hook, a screw, or the like, so that the liquid detection device maintains a fixed distance from the surface to be detected.

In an embodiment of the present invention, the measuring circuit compares the impedance values measured by the first electrode and the second electrode, and then determines the type of abnormal liquid detected on the surface to be detected.

In an embodiment of the present invention, the liquid detection device may further include a transmission circuit. The measurement circuit interacted with an external circuit for the measurement of abnormal liquid. In this embodiment, the transmission circuit transmits the measurement result to the external device, and the external device judges the measurement result and takes a corresponding operation. In this embodiment, the external device is also a liquid detection device, and the plurality of liquid detection devices work in conjunction with each other to jointly perform the liquid detection. In other possible embodiments, the external device may transmit a set of measurement settings to the measurement circuit, performing a measurement based on the measurement settings for different environments or the requirements of different users.

In an embodiment of the present invention, the liquid detection device may further include a third electrode, the distance between the third electrode and the surface to be detected is set as the third distance. The third distance is different from the first distance and the second distance.

The present invention can be further developed into various liquid detection systems. The liquid detection system includes a plurality of liquid detection devices, and each of the liquid detection devices includes a housing, a first electrode, a second electrode, a measurement circuit and a controller. The first electrode is mounted on the surface of the housing, and the distance between the first electrode and the surface to be detected is set as the first distance. The second electrode is also mounted on the surface of the housing, a distance between the second electrode and the surface to be detected is set as the second distance, and the first distance and the second distance have a distance difference.

The measuring circuit is installed inside the housing. The measuring circuit connects the first electrode and the second electrode. When abnormal liquid appeared on the surface to be detected, a current loop is generated between the first electrode and the second electrode, and then the measuring circuit measures impedance value of the current loop between the first electrode and the second electrode, to distinguish whether there is abnormal liquid on the surface to be detected or not. The controller is responsible for collecting the measurement results of the plurality of liquid detection devices in the liquid detection system and performing corresponding operations.

In the liquid detection system, the plurality of liquid detection devices are placed at a plurality of locations in a working area, and the liquid detection device may further include a positioning device. When collecting the measurement result, the controller refers to the information of the positioning device to execute a corresponding operation.

In addition, this liquid detection system can be used in a single machine as well as in a working area. When the plurality of liquid detection devices are used to be placed in different positions of a machine, the controller is used for setting the positions of the plurality of liquid detection devices by a user, collecting the measurement results and referring to the information of the set position to execute the corresponding operation.

In other possible embodiments, the liquid detection system is more applicable to building internal monitoring, and the plurality of liquid detection devices are used to be placed on different walls or floors of a building, and the controller is used for setting the locations of the plurality of liquid detection devices by a user, collecting the measurement results and referring to the information of the set position to determine whether there is water leakage in the building and indicate the water leakage position.

In other possible embodiments, the liquid detection system can be applied to monitor water supply systems and sewerages. The plurality of liquid detection devices are used to be placed at different positions of a sewer, and the controller is used for setting the locations of the plurality of liquid detection devices by a user, collecting the measurement results and referring to the information of the set position to determine whether abnormal water flow occurs in the sewer.

In other possible embodiments, the plurality of liquid detection devices in the liquid detection system are connected to the controller through a wireless network, and the controller is a server, and the user connected to the server through a terminal device to set the plurality of liquid detection devices.

DETAILED DESCRIPTION

For industrial environment, it is very important to detect the leakage of chemical substances as soon as possible. Toxic industrial chemicals or volatile organic compounds will endanger the safety of workers. For example, liquid leakage occurs in water or gas transportation lines, chemical plants or thermal power plants, or air-conditioning systems. Physiochemical or chemical-based pressure sensors, accelerometers and acoustics acoustic sensor will help to detect leakages. The sensor must be easy to install and maintain, and has the characteristics of fast response, along life, and not easily to be damaged.

The present invention provides a liquid detection device for detecting whether there is abnormal liquid on the surface to be detected. Abnormal liquid accumulation affects the normal operation of equipment, result in production line failure, cause damage to buildings, or even cause work safety accidents. Liquid detection devices are widely used in sewerage system and water supply system of buildings and congregate housing. Liquid detection devices are also applied to agricultural water supply systems, water purification stations, sewage treatment plants and general factories.

One or more preferred embodiments of the present invention are given below, which are used to describe the present invention in detail, and should not be construed as limitations of the present invention.

Figure 1:
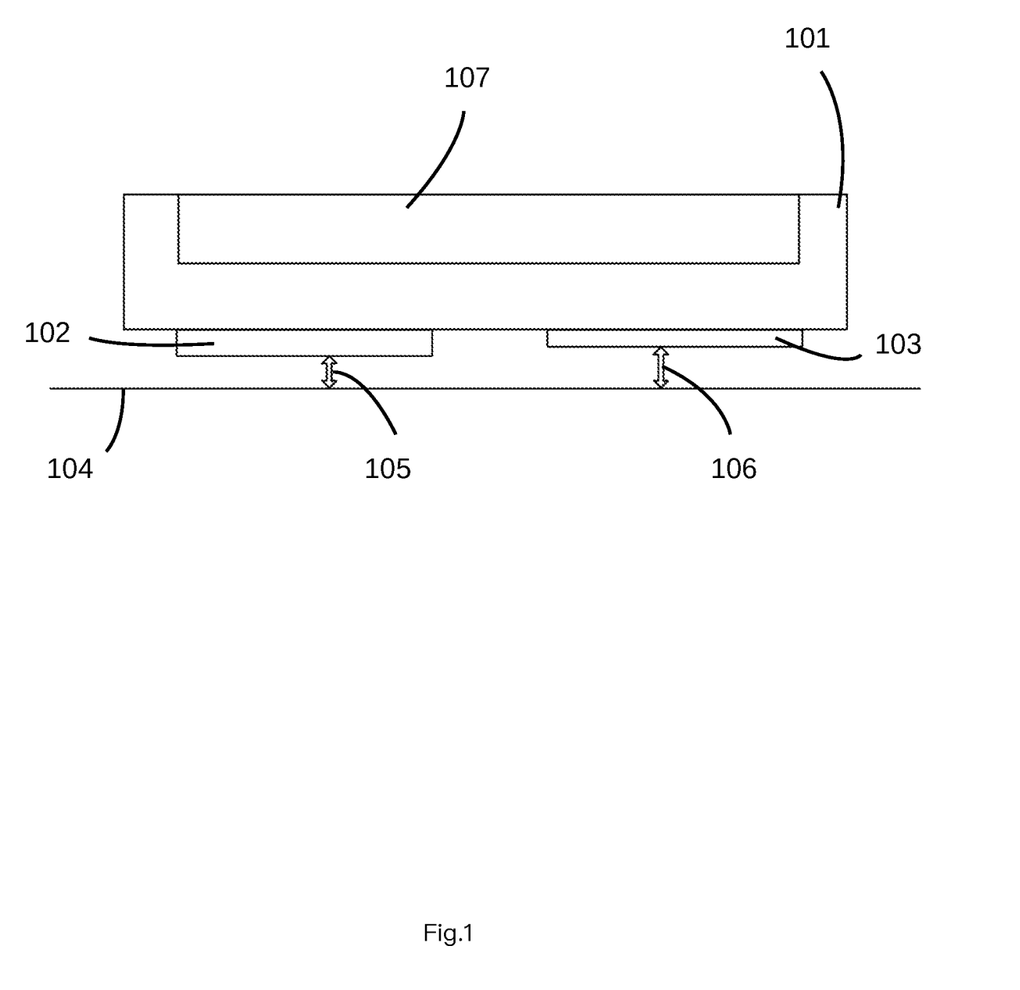
FIG. 1 is a schematic diagram of a relative relationship between a liquid detection device and a surface to be detected in the first embodiment of the present invention.

Please refer to FIG. 1, FIG. 1 is a schematic diagram of a relative relationship between a liquid detection device and a surface to be detected in the first embodiment of the present invention. In the first embodiment, the liquid detection device includes a housing 101, a first electrode 102, a second electrode 103 and a measuring circuit 107. The first electrode 102 is mounted on the surface of the housing 101. A distance between the first electrode 102 and the surface 104 to be detected is set as the first distance 105. The second electrode 103 is also mounted on the surface of the housing 101. A distance between the second electrode 103 and the surface 104 to be detected is set as the second distance 106. The first distance and the second distance are different. While the measuring circuit 107 is installed inside the housing 101, and the measuring circuit 107 connects the first electrode 102 and the second electrode 103. When abnormal liquid appeared on the surface 104 to be detected, a current loop is generated between the first electrode 102 and the second electrode 103, and then the measuring circuit 107 measures impedance value of the current loop between the first electrode 102 and the second electrode 103, to distinguish whether there is abnormal liquid on the surface to be detected or not.

Figure 2:
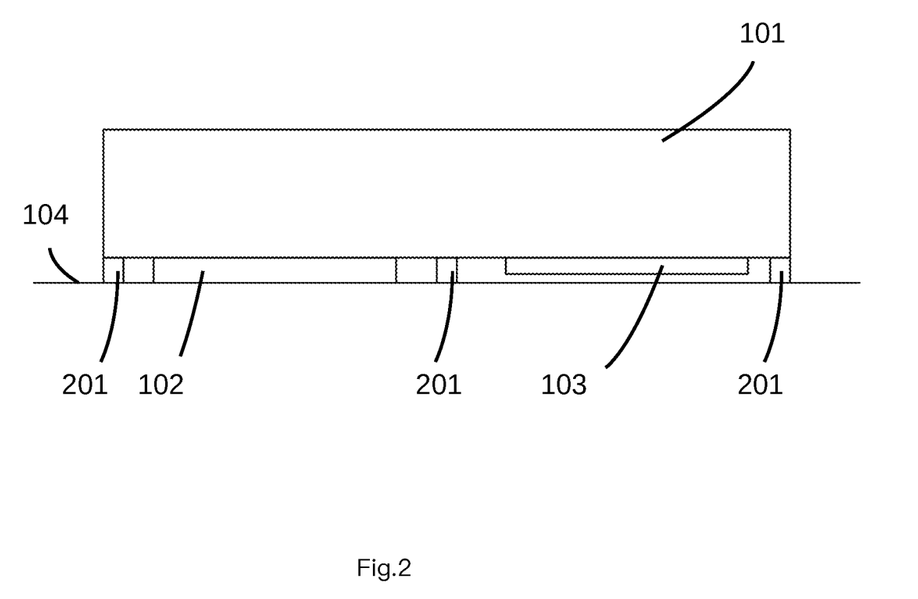
FIG. 2 is a schematic diagram of a supporting structure in the second embodiment of the present invention.

Please refer to FIG. 2, FIG. 2 is a schematic diagram of a supporting structure in the second embodiment of the present invention. In this embodiment, the liquid detection device further includes a support structure 201. The support structure 201 is mounted on the surface of the housing 101. The liquid detection device contacts with the surface 104 to be detected through the support structure 201 to become a stable support point, such that the first distance between the first electrode 102 and the surface 104 to be detected and the second distance between the second electrode 103 and the surface to be detected can be maintained.

Please refer to FIG. 1 and FIG. 2 at the same time. The first distance 105 and the second distance 106 between the liquid detection device and the surface 104 to be detected have a distance difference. Through this distance difference, when the surface 104 to be detected is just beginning to have abnormal liquid, the first electrode 102 and the second electrode 103 are not yet turned on. After a period of time, when sufficient abnormal liquid accumulated on the surface 104 to be detected to meet the second electrode 103, conduction is generated between the first electrode 102 and the second electrode 103. The detection accuracy of the measuring circuit 107 can be adjusted by such a design, so that the liquid detection device can adjust the sensitivity according to the environmental and then reduce the probability of signal misjudgment.

In other embodiments of the invention, the liquid detection device further includes a static electricity elimination circuit. The static electricity elimination circuit eliminates static electricity existed in the liquid detection device according to a predetermined setting. The so-called static electricity, are stationary charges or the non-flowing charges (the flowing charges form current). Static electricity generated when charges accumulate on or over an object. Charge transfer occurs when an object with static electricity contacts a zero-potential object (grounded object), or contacts an object with a potential difference from it. In daily life, any two objects of different materials contact with each other and then separate, static electricity will be generated. The objects mentioned here can be solid, liquid or even gas, which can be electrostatically charged by contact and separation. As the gas is also composed of molecules, atoms, when the air flows, molecules, atoms also can be electrostatically charged by "contact and separation". In other words, static electricity can be generated at anytime and anywhere in our life. The generation of static electricity is inevitable in industrial production, the harm is mainly caused by electrostatic discharge and electrostatic attraction. For example, static electricity can cause malfunction or maloperation of electronic equipment, electromagnetic interference. Static electricity can break down integrated circuits and sophisticated electronic components or cause component aging and reduce production yield. High-voltage electrostatic discharge will cause electric shock, endanger safety of others, and in the production sites of flammable, explosive, dust, or oil mist, static electricity can easily cause an explosion and fire. In addition, electronic industry, film and plastics industry, paper printing industry or textile industry, all should avoid the accumulation of static electricity, which will lead to poor product yield and bad impact on production efficiency. In the embodiment of the present invention, when static electricity accumulated on the electrode surface of the liquid detection device, which will make the electrode surface easy to absorb dust and oil, affecting the detection accuracy. The electrostatic spark igniting the flammable objects nearby cause explosions.

In other embodiments of the invention, including the static electricity elimination circuit in the liquid detection device, the static electricity elimination circuit can detect and record the static electricity quantity of the environment, and allow the measuring circuit to refer to the static electricity quantity of the environment. When the current loop generated between the first electrode and the second electrode, which is caused by the static electricity accumulated on the electrode surface, the measurement circuit will not issue the corresponding control information. It can effectively avoid misjudgment by this method. In addition to eliminate the static electricity existed in the liquid detection device according to a preset value and detecting and recording the static electricity quantity of the environment, the static electricity elimination circuit is timed by the central processing unit to periodically eliminate the static electricity.

Figure 3A:
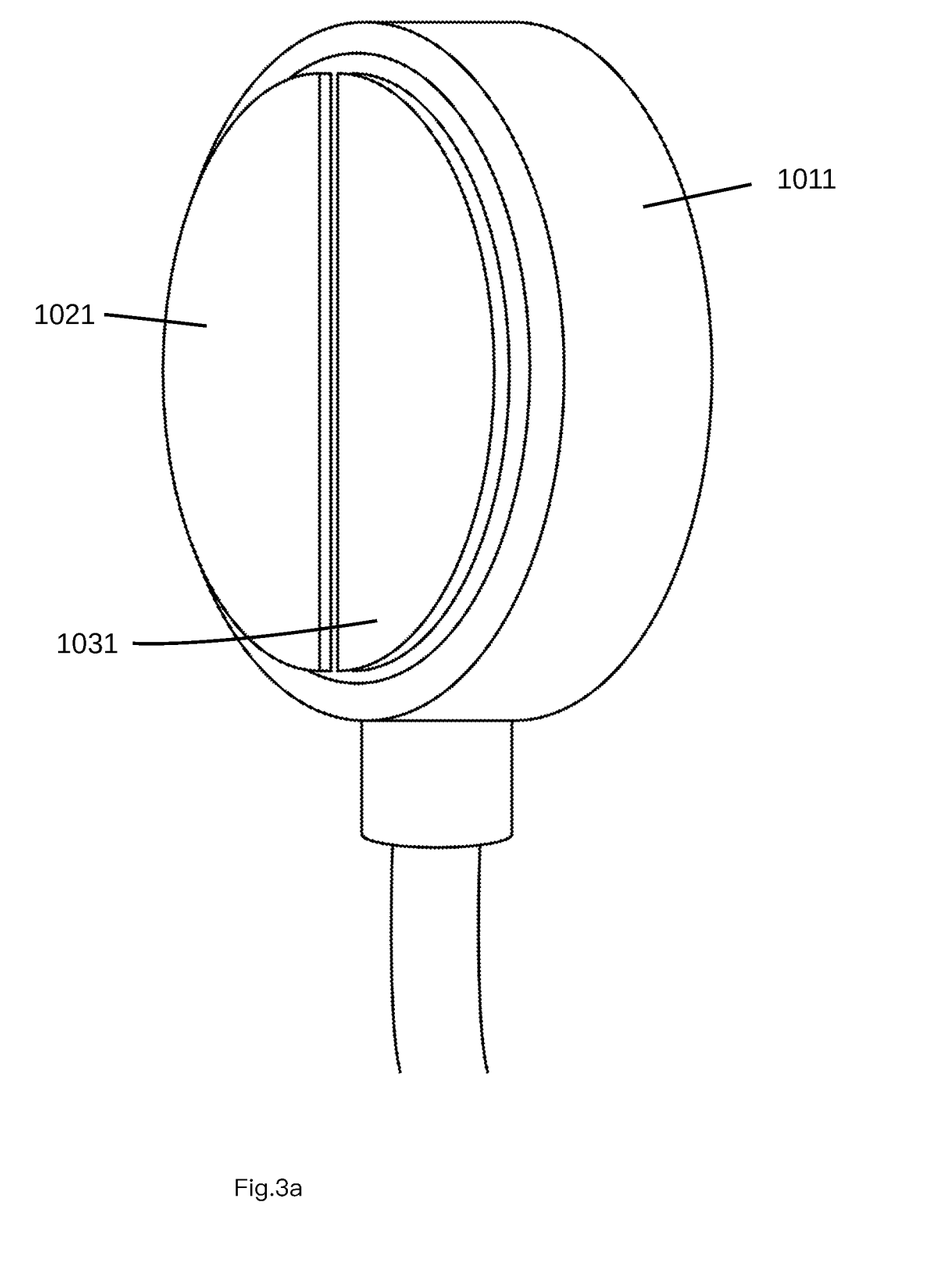
FIG. 3a is a schematic diagram of a liquid detection device in the third embodiment of the present invention.
Figure 3B:
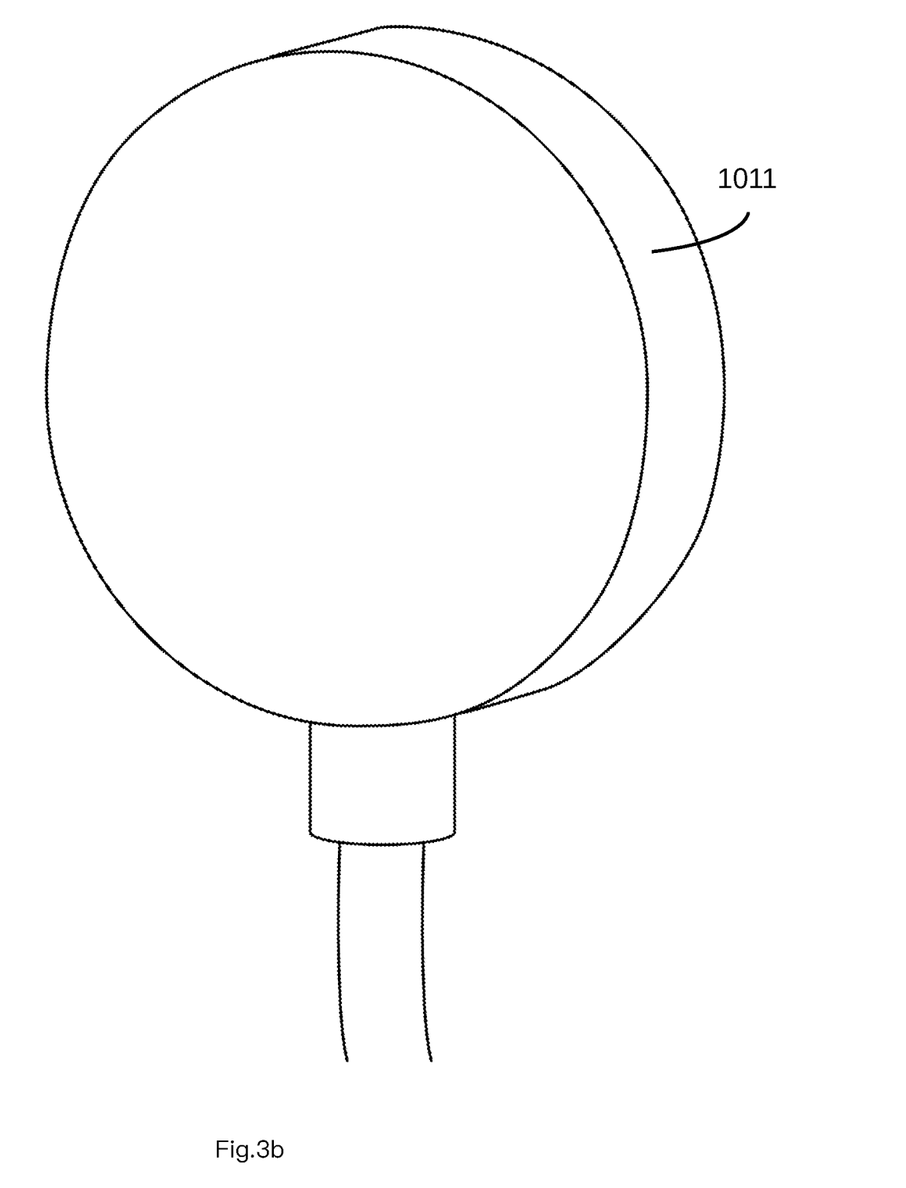
FIG. 3b is another perspective view of the liquid detection device in the third embodiment of the present invention.

Please refer to FIG. 3a and FIG. 3b at the same time. FIG. 3a is a schematic diagram of a liquid detection device in the third embodiment of the present invention. FIG. 3b is another perspective view of the liquid detection device in the third embodiment of the present invention. In this embodiment, the housing 1011 of the liquid detection device is oblate, and the first electrode 1021 and the second electrode 1031 are semicircular. In addition, there is a distance between the first electrode 1021 and the second electrode 1031. For example, the distance may be 2.5 mm or more, can avoid the aging of the coating material of the tail wire, which will make two electrodes contact, cause a short circuit and false alarm. In other embodiments, the liquid detection device may further include a fixing auxiliary element, such as a magnet, a clip, a sticker, a hook, a screw, or the like, so that the liquid detection device maintains a fixed distance from the surface to be detected, and the fixing auxiliary element also enables the liquid detection device stably mounted on the surface to be detected. For example, if the liquid detection device includes a magnet, the liquid detection device may be more easily attached to various surfaces with a magnetic force, not limited to the ground, making the application scope more widely. In general, the housing 1011 of the liquid detection device may be made of waterproof insulating material or others. For example, the housing 1011 may be made of a material that is resistant to acids and alkalis, so that the liquid detection device can be used to measure chemical liquid leakage.

Please refer to FIG. 1 again. In other embodiments of the present invention, the measuring circuit 107 compares the impedance values measured by the first electrode 102 and the second electrode 103, and then determines the type of abnormal liquid detected on the surface to be detected.

In other embodiments of the present invention, the liquid detection device may further include a transmission circuit, so that the measurement circuit interacted with an external circuit the external circuit for the measurement of abnormal liquid. In this embodiment, the transmission circuit transmits the measurement result to the external device, and the external device judges the measurement result and takes a corresponding operation. In this embodiment, the external device is also a liquid detection device, and the plurality of liquid detection devices work in conjunction with each other to jointly perform the liquid detection. In other possible embodiments, the external device may transmit a set of measurement settings to the measurement circuit, performing a measurement based on the measurement settings to match different environment or the requirements of different users.

Figure 4:
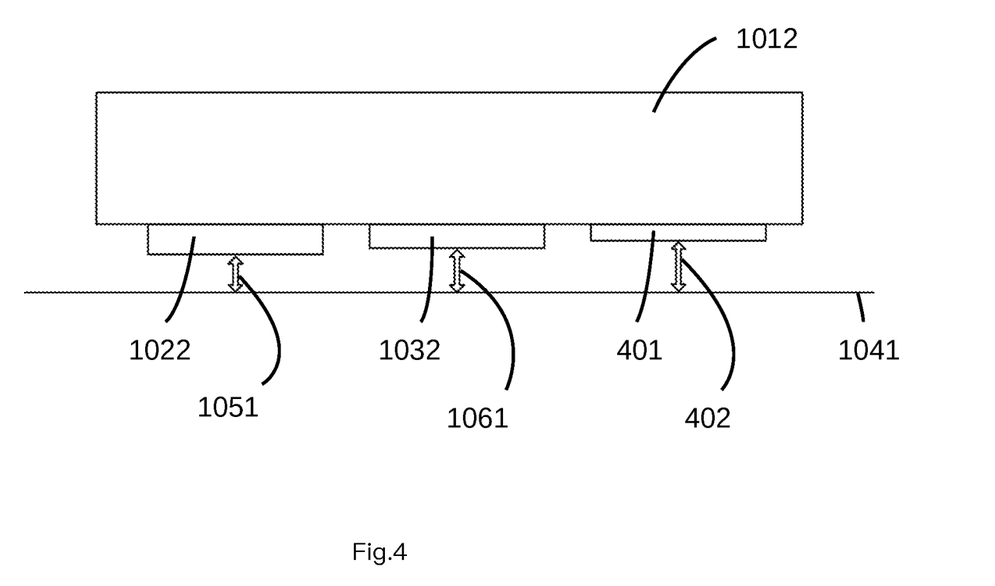
FIG. 4 is a schematic diagram of a relative relationship between a liquid detection device and a surface to be detected in the fourth embodiment of the present invention.

Please refer to FIG. 4. FIG. 4 is a schematic diagram of a relative relationship between a liquid detection device and a surface to be detected in the fourth embodiment of the present invention. In this embodiment, the liquid detection device may further include a third electrode 401. The first electrode 1022 is mounted on the surface of the housing 1012. A distance between the first electrode 102 and the surface 1041 to be detected is set as the first distance 1051. The second electrode 1032 is mounted on the surface of the housing 1021. A distance between the second electrode 1032 and the surface 1041 to be detected is set as the second distance 1061. The first distance and the second distance have a distance difference. The distance between the third electrode 401 and the surface 1041 to be detected is set as the third distance 402. The third distance 402 is different from the first distance 1051 and the second distance 1061.

Figure 5:
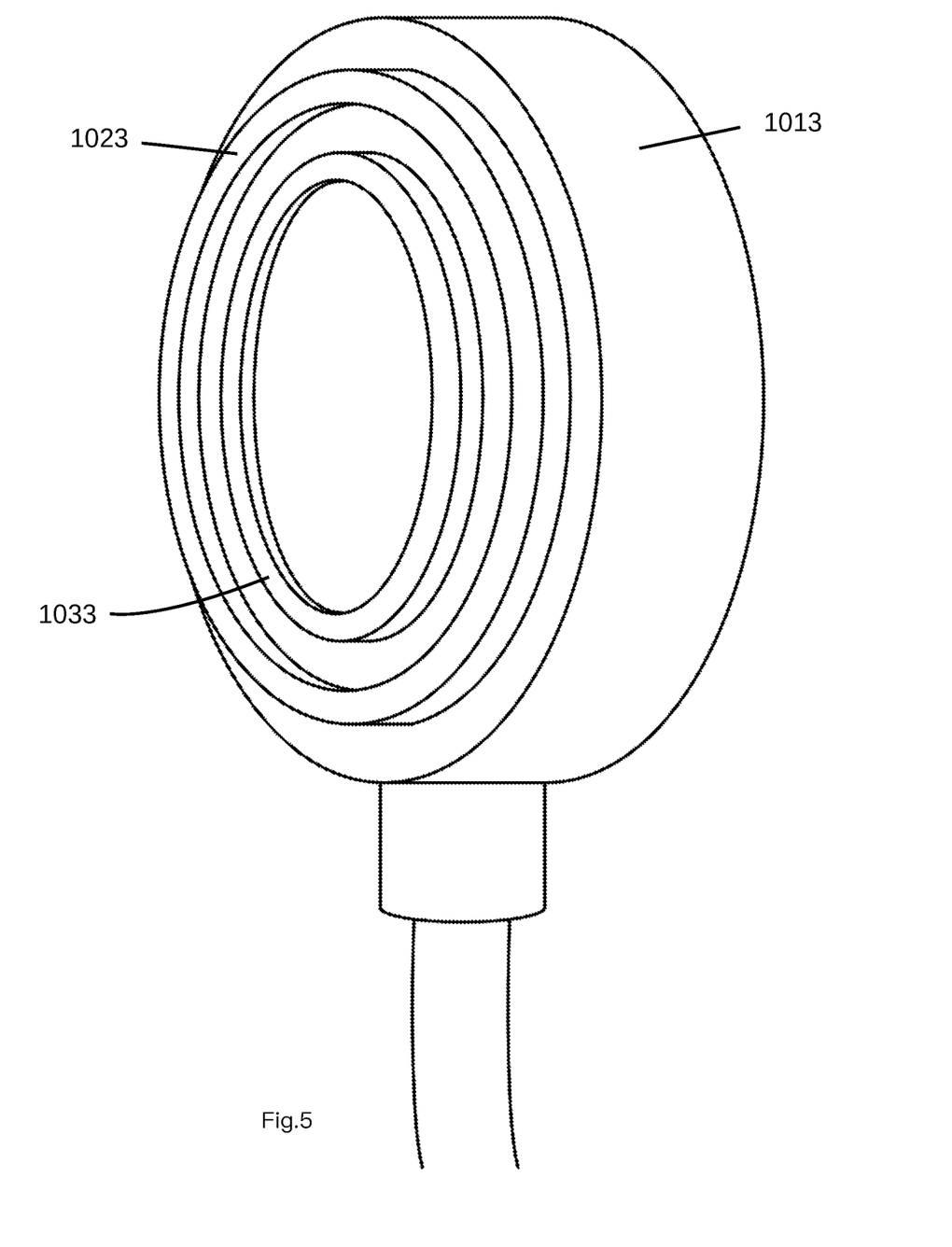
FIG. 5 is a schematic diagram of a liquid detection device in a fifth embodiment of the present invention.

Please refer to FIG. 5. FIG. 5 is a schematic diagram of a liquid detection device in a fifth embodiment of the present invention. In this embodiment, the first electrode 1023 is concentric with the second electrode 1033, and the first electrode 1023 is spaced from the second electrode 1033. The concentric first electrode 1023 and the second electrode 1033 can make the liquid detection device stably stick to the surface to be detected. In other possible embodiments, the electrodes may be semicircular, concentric, and many more.

Please refer to FIG. 1 again. There are many possible embodiments of the measurement circuit 107 described in FIG. 1, and one possible mode of operation is provided below.

Figure 6:
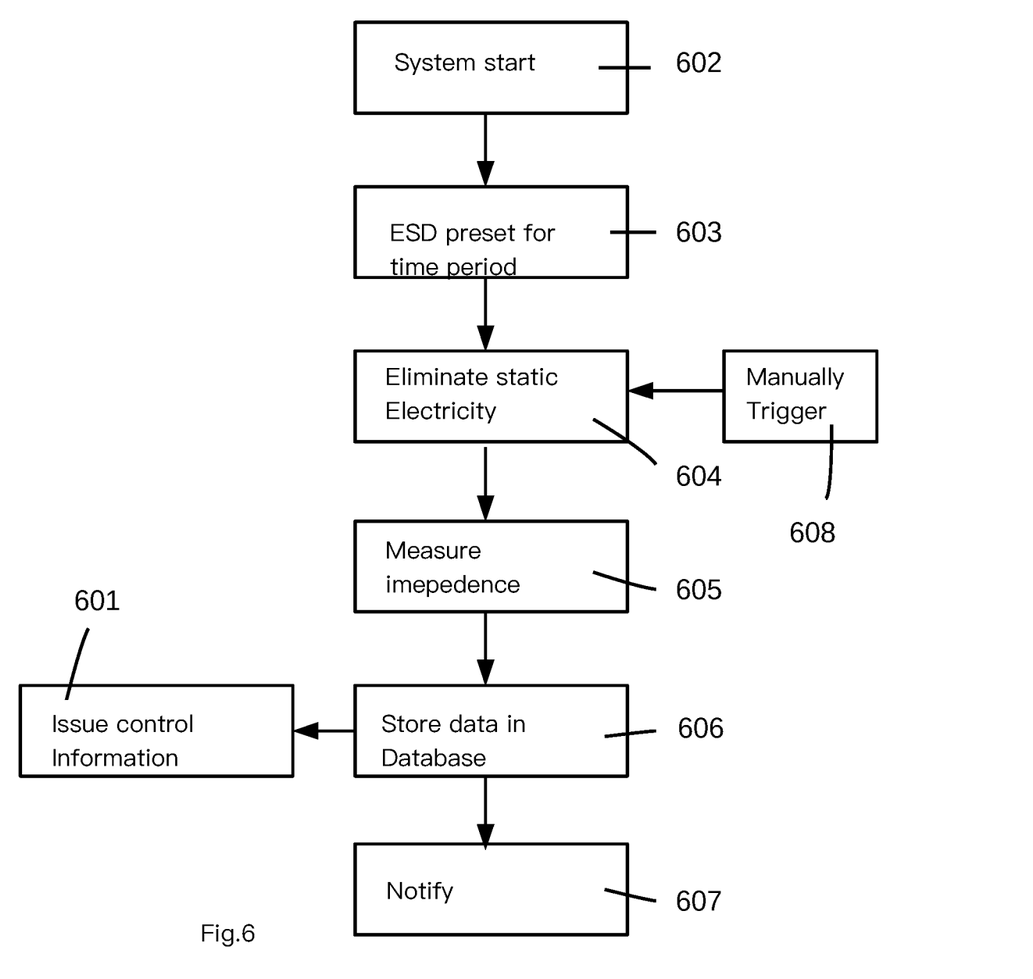
FIG. 6 is a schematic diagram of the operation of the measuring circuit in the sixth embodiment of the present invention.

Please refer to FIG. 6. FIG. 6 is a schematic diagram of the operation of the measuring circuit in the sixth embodiment of the present invention. The operation of the liquid detection device including the static electricity elimination circuit is as follows. When the liquid detection device is activated (step 602), the system presets for a time period (step 603), and the liquid detection device will activate the function of eliminating static electricity when the operation time reaches the time period (Step 604). Each time when the static electricity is eliminated, the device starts a re-time measurement to periodically and automatically eliminate static electricity. After the liquid detection device eliminates the static electricity, the liquid detection device activates the measurement circuit and measures whether there is a current loop between the first electrode and the second electrode and measure the impedance value of the current loop (step 605). Stores the data in the database (step 606), and compares the measurement data with the external database. If the measurement data meets the static electricity triggering value of the external database, the measurement circuit will not issue the corresponding control information. Conversely, corresponding notification processing may be performed (step 607). If the measurement data doesn't meet the static electricity triggering value of the external database, the measurement circuit will issue the corresponding control information (step 601). After the data is stored in the database, the liquid leakage alarm may be transmitted. In this embodiment, the static elimination function may also be manually activated (step 608). Regardless of the result, you can save the data to the database first. Of course, other operations or modifications to some of the procedures should not be construed as limiting the scope of the invention.

The present invention also relates to a liquid detection system. The liquid detection system includes a plurality of liquid detection devices, and each of the liquid detection devices includes a housing, a first electrode, a second electrode, a measurement circuit and a controller. The first electrode is mounted on the surface of the housing, and the distance between the first electrode and the surface to be detected is set as the first distance. The second electrode is also mounted on the surface of the housing, a distance between the second electrode and the surface to be detected is set as the second distance. The first distance and the second distance are different. While the measuring circuit is installed inside the housing, and the measuring circuit connects the first electrode and the second electrode. When abnormal liquid appeared on the surface to be detected, a current loop is generated between the first electrode and the second electrode, and then the measuring circuit measures impedance value of current loop between the first electrode and the second electrode, to distinguish whether there is abnormal liquid on the surface to be detected or not. The controller is responsible for collecting the measurement results of the plurality of liquid detection devices in the liquid detection system and performing corresponding operations.

In the liquid detection system, a plurality of the liquid detection devices are used to be placed at a plurality of locations in a working area, and the liquid detection device may further include a positioning device. When collecting the measurement result, the controller refers to the information of the positioning device to execute a corresponding operation. The liquid detection system can be used in a single machine as well as in a working area. When the plurality of liquid detection devices are used to be placed in different positions of a machine, the controller is used for setting the positions of the plurality of liquid detection devices by a user, collecting the measurement results and referring to the information of the set position to execute the corresponding operation.

In other possible embodiments, the liquid detection system is more applicable to building internal monitoring, and the plurality of liquid detection devices are used to be placed on different walls or floors of a building, and the controller is used for setting the locations of the plurality of liquid detection devices by a user, collecting the measurement results and referring to the information of the set position to determine whether there is water leakage in the building and indicate the water leakage position.

In other possible embodiments, the liquid detection system can be applied to monitor water supply systems and sewerages. The plurality of liquid detection devices are placed at different positions of a pipe, and the controller is used for setting the locations of the plurality of liquid detection devices by a user, collecting the measurement results and referring to the information of the set position to determine whether abnormal water flow occurs in the sewer.

In other possible embodiments, a plurality of the liquid detection devices in the liquid detection system are connected to the controller through a wireless network, and the controller is a server, and the user connected to the server through a terminal device to set the plurality of liquid detection devices.

Figure 7:
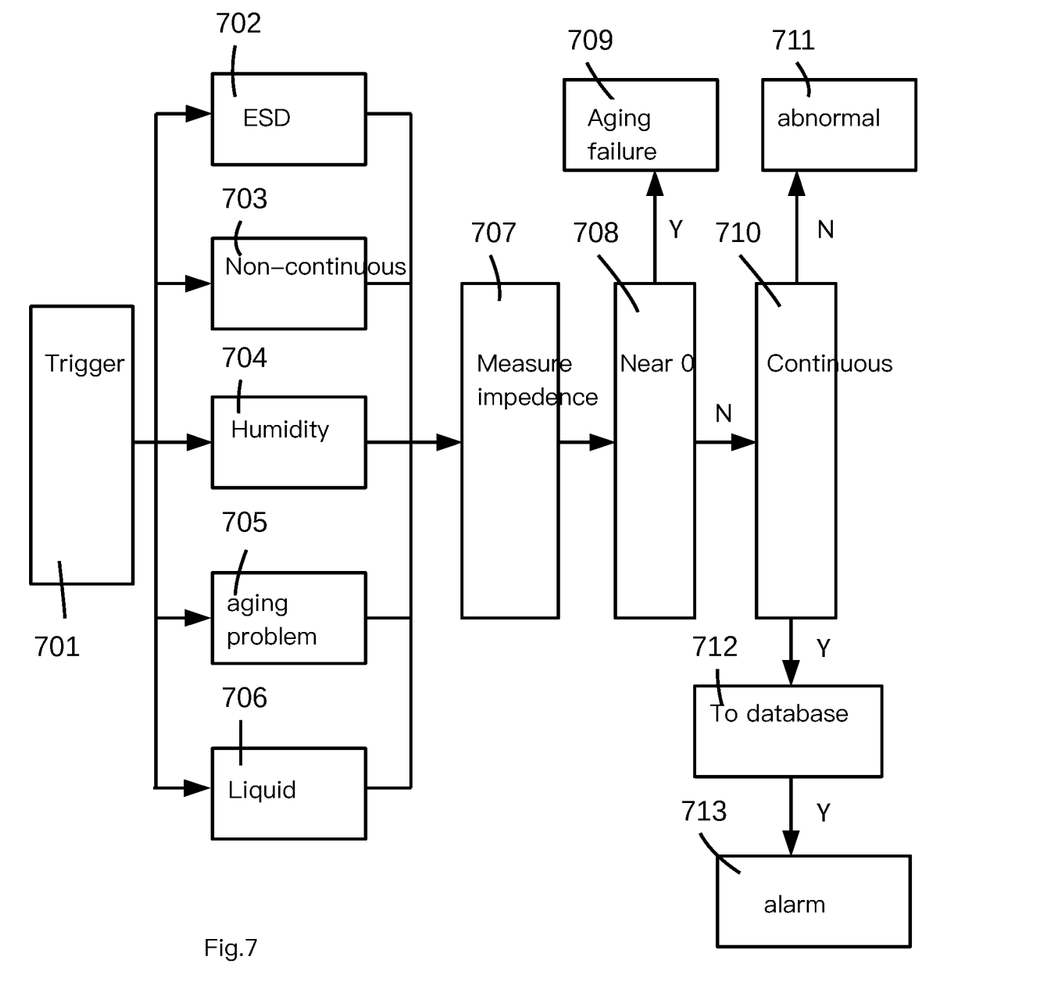
FIG. 7 is a schematic diagram of the operation of the liquid detection device in the seventh embodiment of the present invention.

In other possible embodiments, the liquid detection device can further analyze the reason of the signal triggering, and distinguish the abnormal installation environment or the equipment failure. Please refer to FIG. 7, FIG. 7 is a schematic diagram of the operation of the liquid detection device in the seventh embodiment of the present invention. The operation of the liquid detection device is as follows. When a current loop is generated between the electrodes of the liquid detection device (step 701), the triggering reason may be static electricity accumulation (step 702), single non-continuous conduction (step 703), ambient humidity (step 704), device wire aging failure (step 705), liquid leakage (step 706). In order to further distinguish the triggering reason and reduce the chance of misjudgment, the liquid detection device first measures the impedance value of the current loop (step 707), and determines whether the impedance value approaches zero (step 708). If the impedance value approaches zero, it indicates a wire aging failure of the liquid detection device (step 709). If the impedance value does not approach zero, the system will make a further interpretation to detect whether the signal continues to be triggered (step 710). The non-continuous triggering signal represents the installation environment of the liquid detection device is abnormal (step 711). The collected data is stored in the database anyway (step 712). Continuous triggering signal further analyze the impedance value, if the impedance value is consistent with the impedance value caused by static electricity, the liquid detection device will store the triggering signal in the database for subsequent comparison. If the impedance value matches the impedance value of particular liquid, it indicates that fluid leakage does occur, the liquid detection device will issue an abnormal alarm (step 713).

Figure 8:
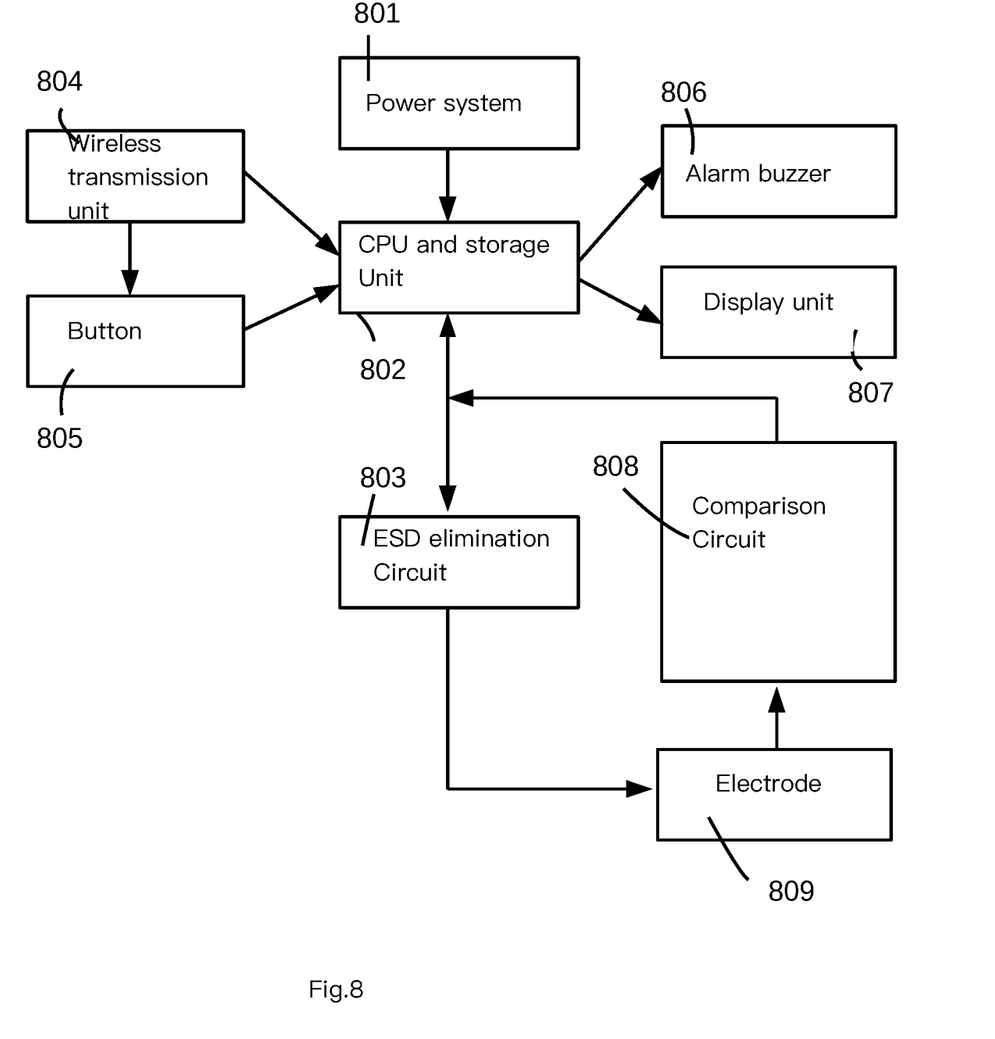
FIG. 8 is a schematic diagram of the operation of the liquid detection system in the eighth embodiment of the present invention.

Another possible embodiment of the liquid detection system is provided below. Please refer to FIG. 8, FIG. 8 is a schematic diagram of the operation of the liquid detection system in the eighth embodiment of the present invention. The liquid detection system includes a power system 801. The power system supplies power to a central processing unit and a storage unit 802. The central processing unit and the storage unit are control centers of the liquid detection system. The central processing unit provides a control message to the static electricity elimination circuit 803 to an electrode 809. After the static electricity is eliminated, the electrode detects an impedance value between the two electrodes, and converts the impedance value into a digital signal through an analog-to-digital converter (ADC) comparison circuit 808. The digital signal is sent back to the central processing unit and the storage unit. The central processing unit and the storage unit send a control message to the alarm buzzer according to the digital signal 806. The central processing unit and the storage unit may also send a control message to the system status display unit 807. The user may know the condition of the liquid leakage from the system status display unit. The parameters of the liquid detection system can also be set by the user. The user may directly set the central processing unit through the wireless transmission unit 804. The user may also control the operation button unit through the wireless transmission unit, and the operation button unit resets the central processing unit 805.

In addition to the above-described embodiments, various modifications may be made, and as long as it is within the spirit of the same invention, the various designs that can be made by those skilled in the art are belong to the scope of the present invention.

The invention claimed is:

1. A liquid detection device, for detecting whether there is abnormal liquid on a surface to be detected, comprising:
   a housing;
   a first electrode, mounted on a bottom surface of the housing, the bottom surface facing to the surface to be detected, wherein a distance between the first electrode and the surface to be detected is set as a first distance;
   a second electrode, mounted on the bottom surface of the housing, wherein a distance between the second electrode and the surface to be detected is set as a second distance, the first distance and the second distance having a distance difference so that one of the first electrode and the second electrode is spaced relatively farther from the surface to be detected and the other is spaced relatively closer to the surface to be detected, the first electrode and the second electrode being exposed to the abnormal liquid on the surface to be detected;
   a measuring circuit, installed inside the housing, and connected the first electrode and the second electrode, wherein a sensitivity of the liquid detection device is adjusted by adjusting the distance difference between the first electrode and the second electrode; and
   a static electricity elimination circuit for eliminating static electricity existed in the liquid detection device periodically, wherein the static electricity elimination circuit detects and records an environment static electricity quantity, and the measuring circuit determines whether there is the abnormal liquid or not according to impedance value between the first electrode and the second electrode, and the measuring circuit also references the detected and recorded environment static electricity quantity to avoid misjudgment.

2. The liquid detection device of claim 1, further comprising a support structure, the support structure mounted on the housing, the liquid detection device contacted with the surface to be detected through the support structure, such that the first distance between the first electrode and the surface to be detected and the second distance between the second electrode and the surface to be detected can be maintained.

3. The liquid detection device of claim 1, wherein the housing is oblate, the first electrode and the second electrode are semicircular, and there is a distance between the first electrode and the second electrode.

4. The liquid detection device of claim 3, further comprising a fixing auxiliary element to make the liquid detection device maintained a fixed distance from the surface to be detected.

5. The liquid detection device of claim 1, wherein the measuring circuit uses the measured impedance value for determining a type of detected abnormal liquid.

6. The liquid detection device of claim 1, further comprising a transmission circuit, so that the measurement circuit interacted with an external device for the measurement of abnormal liquid.

7. The liquid detection device of claim 6, wherein the transmission circuit transmits the measurement result to the external device, and the external device judges the measurement result and takes a corresponding operation.

8. The liquid detection device of claim 6, wherein the external device is also a liquid detection device, and the plurality of liquid detection devices work in conjunction with each other to jointly perform the liquid detection.

9. The liquid detection device of claim 6, wherein the external device transmits a set of measurement settings to the measurement circuit, performing a measurement based on the measurement settings.

10. The liquid detection device of claim 1, further comprising a third electrode, a distance between the third electrode and the surface to be detected is set as a third distance, the third distance is different from the first distance and the second distance.

* * * * *